US011689587B2

(12) United States Patent
Grover et al.

(10) Patent No.: US 11,689,587 B2
(45) Date of Patent: Jun. 27, 2023

(54) METHODS, SYSTEMS, AND COMPUTER READABLE MEDIA FOR OPTIMIZED INTER-SESSION BORDER CONTROLLER (SBC) ATTENDED CALL TRANSFER WITH RE-USE OF TRANSFER TARGET SESSION (71) Applicant: Oracle International Corporation, Redwood Shores, CA (US)

(72) Inventors: Lalit Grover, Haryana (IN); Vimal Chandra Tewari, Bangalore (IN); Jayesh Shrimali, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 17/152,731

(22) Filed: Jan. 19, 2021

(65) Prior Publication Data
US 2022/0232053 A1 Jul. 21, 2022

(51) Int. Cl.
*H04L 65/1096* (2022.01)
*H04L 65/1104* (2022.01)
*H04L 65/1069* (2022.01)

(52) U.S. Cl.
CPC ...... *H04L 65/1096* (2013.01); *H04L 65/1069* (2013.01); *H04L 65/1104* (2022.05)

(58) Field of Classification Search
CPC ............. H04L 65/1096; H04L 65/1104; H04L 65/1069
USPC ....................................................... 379/259
See application file for complete search history.

(56) References Cited

U.S. PATENT DOCUMENTS

| 2003/0097447 | A1 | 5/2003 | Johnston |
| 2008/0052400 | A1 | 2/2008 | Ekberg |
| 2015/0365532 | A1 | 12/2015 | Ristock et al. |
| 2017/0272479 | A1* | 9/2017 | Fritz ...................... H04L 12/44 |
| 2018/0077229 | A1 | 3/2018 | Bharrat et al. |
| 2018/0167420 | A1 | 6/2018 | Shukla et al. |
| 2020/0186574 | A1 | 6/2020 | Amin et al. |
| 2023/0130424 | A1 | 4/2023 | Juneja |

OTHER PUBLICATIONS

Notification of Transmittal of the International Search Report and the Written Opinion of the International Searching Authority, or the Declaration for International Application No. PCT/US2021/064109 (dated Apr. 5, 2022).

(Continued)

*Primary Examiner* — Jirapon Tulop
(74) *Attorney, Agent, or Firm* — Jenkins, Wilson, Taylor & Hunt, P.A.

(57) ABSTRACT

A first SBC establishes a first media session between a transferor and a transferee. A second SBC establishes a second media session between the transferor and a transfer target. The first SBC receives a REFER message initiated by the transferor and determines that a dialog ID in the REFER message does not correspond to a media session currently being handled by the first SBC. The first SBC sends a SIP INVITE message to a plurality of SBCs, including the second SBC, that are in a load sharing group with the first SBC. The SIP INVITE message includes the dialog ID associated with the second media session, which triggers the second SBC to re-use the second media session to establish a media session between the transferee and the transfer target.

14 Claims, 9 Drawing Sheets

(56) References Cited

OTHER PUBLICATIONS

Sparks et al., "Session Initiation Protocol (SIP) Call Control—Transfer Status of This Memo," Network Working Group, Request for Comments: 5589, pp. 1-58 (Jun. 2009).
Rosenberg, J. et al., "RFC: 3261—SIP: Session Initiation Protocol," Standards Track, pp. 1-256, (Jun. 2002).
"Oracle Communications Session Border Controller", Data Sheet, Version 1.03, pp. 1-9 (2020).
Non-Final Office Action for U.S. Appl. No. 17/508,338 (dated Aug. 30, 2022).
Johnston et al., "Session Initiation Protocol (SIP) Basic Call Flow Examples," Network Working Group, Request for Comments 3665, pp. 1-94 (Dec. 2003).
Sparks, "The Session Initiation Protocol (SIP) Refer Method," Network Working Group, Request for Comments 3515, pp. 1-23 (Apr. 2003).

* cited by examiner

METHODS, SYSTEMS, AND COMPUTER READABLE MEDIA FOR OPTIMIZED INTER-SESSION BORDER CONTROLLER (SBC) ATTENDED CALL TRANSFER WITH RE-USE OF TRANSFER TARGET SESSION

TECHNICAL FIELD

The subject matter described here in relates to call transfer. More particularly, the subject matter described herein relates to methods, systems, and computer readable media for optimized inter-SBC attended call transfer with re-use of the transfer target session.

BACKGROUND

Call transfer or call forwarding is a mechanism for reallocating a telephone call from one phone to another phone. Every transfer event involves three parties, which in voice over Internet protocol (VoIP) networks are referred to as user agents. The three parties are:

transferor: the party initiating the call transfer;

transferee: the party whose call or session is being connected with or transferred to the transfer target; and transfer target: the new party being introduced into a call with the transferee.

In the case of voice over IP calls, call transfer can be achieved using the session initiation protocol (SIP) REFER method. The SIP REFER method is defined in Internet Engineering Task Force (IETF) Request for Comments (RFC) 3515. One of the applications of the SIP REFER method is call transfer. For example, IETF RFC 3515 states:

> [The SIP REFER method] can be used to enable many applications, including Call Transfer. For instance, if Alice is in a call with Bob, and decides Bob needs to talk to Carol, Alice can instruct her SIP user agent (UA) to send a SIP REFER request to Bob's UA providing Carol's SIP Contact information. Assuming Bob has given it permission, Bob's UA will attempt to call Carol using that contact. Bob's UA will then report whether it succeeded in reaching the contact to Alice's UA.

In the above-quoted passage, IETF RFC 3515 indicates that the SIP REFER method can be used to effect a call transfer.

Primarily, there are two ways of transferring a call through the SIP REFER method:

blind or unattended call transfer attended call transfer

In blind or unattended call transfer, the transferor provides the transfer target's contact information for the transferee to directly initiate a call with the transfer target. In attended call transfer, the transferor places the transferee on hold, establishes a call with the transfer target to alert the transfer target to the impending transfer, places the target on hold, then proceeds with the transfer by sending a SIP REFER message to the transferee with a Replaces header field in the Refer-To header. The Replaces header field information is then conveyed by the transferee to the transfer target as part of the INVITE request for the new call. The transfer target uses this information to identify its session with the transferor and correlate the session with the new call.

SBCs perform signaling used to establish and tear down media sessions between user agents, including signaling used for performing attended call transfers. In one type of attended call transfer, an SBC can utilize the SIP Re-INVITE procedure to reuse the media session between the transferor and the transfer target rather than requiring the transferee to establish a new media session with the transfer target. However, the Re-INVITE approach only works if the SBC using the Re-INVITE procedure to perform the call transfer knows about the media session between the transferor and the transfer target. If a network implements session load balancing, the SBC for the original call between the transferee and the transferor may be different from the SBC for the call between the transferor and the transfer target. In such a case, the SBC that established the original call between the transferee and the transferor does not know about the call between the transferor and the transfer target and thus cannot use the Re-INVITE procedure to reuse the call between the transferor and the transfer target, which may result in a failed call transfer attempt.

In light of these difficulties, there exists a need for improved methods, systems, and computer readable media for attended call transfer in networks in which session load balancing among SBCs is implemented.

SUMMARY

A method for optimized attended inter-session border controller (SBC) call transfer with transfer target session re-use is provided. The method includes, at a first SBC, establishing a first media session between a transferor and a transferee. The method further includes, at a second SBC, in response to a session initiation protocol (SIP) INVITE message initiated by the transferor and routed to the second SBC by a session router, establishing a second media session between the transferor and a transfer target. The method further includes, receiving, at the first SBC, a SIP REFER message initiated by the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message including the dialog ID associated with the second media session. The method further includes, at the second SBC, receiving the SIP INVITE message, recognizing the SIP INVITE message as requesting an attended call transfer to the transfer target, and, in response, signaling with the transfer target and the first SBC to re-use the second media session to establish a media session between the transferee and the transfer target.

According to another aspect of the subject matter described herein, establishing the first media session includes establishing the first media session in response to a SIP INVITE message originated by the transferee and forwarded to the first SBC by a session router that selected the first SBC to handle the first media session using call distribution logic.

According to another aspect of the subject matter described herein, the SIP INVITE message initiated by the transferor is sent to the second SBC based on call distribution logic of the session router.

According to another aspect of the subject matter described herein, receiving the SIP REFER message includes receiving the SIP REFER message with a Replaces header that includes the dialog ID associated with the second media session.

According to another aspect of the subject matter described herein, sending the SIP INVITE message including the dialog ID associated with the second media session includes adding a custom header to the SIP INVITE message indicating that the SIP INVITE message is to initiate an attended call transfer that re-uses second media session.

According to another aspect of the subject matter described herein, signaling with the first SBC and the transfer target to re-use the second media session to establish a media session between the transferee and the transfer target includes sending a SIP Re-INVITE message to the transfer target, receiving a success response from the transfer target, and in response to receiving the success response from the transfer target, sending a success response to the first SBC.

According to another aspect of the subject matter described herein, the method for optimized attended inter-SBC call transfer includes establishing a media session between the first and second SBCs. It should be noted that even though signaling is performed to establish the media session between the first and second SBCs, media packets may not be exchanged on the inter-SBC media session. Stated differently, "establishing a media session" as described herein includes performing the signaling to set up the media session but not necessarily exchanging media packets over the media session.

According to another aspect of the subject matter described herein the method for optimized inter-SBC attended call transfer with target session re-use comprises, at the first SBC, replacing an out-dialog of the first media session with an out-dialog of the media session between the first and second SBCs, and, at the second SBC, replacing an in-dialog of the second media session with an in-dialog of the media session between the first and second SBCs.

According to another aspect of the subject matter described herein, the method for optimized attended inter-S BC call transfer with target session re-use includes, at the first SBC, sending a BYE message to the transferor and releasing resources associated with the out-dialog of the first media session.

According to another aspect of the subject matter described herein, the method for optimized attended inter-SBC call transfer with target session re-use includes, at the second, SBC, sending a BYE message to the transferor and releasing resources associated with the in-dialog of the second media session.

According to another aspect of the subject matter described herein, a system for optimized attended inter-session border controller (SBC) call transfer with transfer target session re-use is provided. The system includes a first SBC for establishing a first media session between a transferor and a transferee. The system further includes a second SBC, for, in response to a session initiation protocol (SIP) INVITE message initiated by the transferor and routed to the second SBC by a session router, establishing a second media session between the transferor and a transfer target. The first SBC is configured for receiving a SIP REFER message from the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message including the dialog ID associated with the second media session. The second SBC is configured for receiving the SIP INVITE message, recognizing the SIP INVITE message as requesting an attended call transfer to the transfer target, and, in response, signaling with the transfer target and the first SBC to re-use the second media session to establish a media session between the transferee and the transfer target.

According to another aspect of the subject matter described herein, the first SBC is configured to establish the first media session in response to a SIP INVITE message originated by the transferee and forwarded to the first SBC by a session router that selected the first SBC to handle the first media session using call distribution logic.

According to another aspect of the subject matter described herein, the second SBC is configured to establish the second media session in response to a SIP INVITE message originated by the transferor and forwarded to the session router that selected the second SBC to handle the second media session using call distribution logic.

According to another aspect of the subject matter described herein, the SIP REFER message includes a Replaces header that includes the dialog ID associated with the second media session.

According to another aspect of the subject matter described herein, the first SBC is configured to include the dialog ID associated with the second media session in a custom header of the SIP INVITE message, wherein the custom header indicates that the SIP INVITE message is to initiate an attended call transfer that re-uses second media session.

According to another aspect of the subject matter described herein, in signaling with the first SBC and the transfer target to re-use the second media session to establish a media session between the transferee and the transfer target, the second SBC is configured for sending a SIP Re-INVITE message to the transfer target, receiving a success response from the transfer target, in response to receiving the success response from the transfer target, sending a success response to the first SBC.

According to another aspect of the subject matter described herein, the first and second SBCs are configured for establishing a media session between the first and second SBCs.

According to another aspect of the subject matter described herein, the first SBC is configured for replacing an out-dialog of the first media session with an out-dialog of the media session between the first and second SBCs; and the second SBC is configured for replacing an in-dialog of the second media session with an in-dialog of the media session between the first and second SBCs.

According to another aspect of the subject matter described herein, the first SBC is configured for sending a SIP BYE message to the transferor and releasing resources associated with the out-dialog of the first media session and the second SBC is configured for sending a SIP BYE message to the transferor and releasing resources associated with the in-dialog of the second media session.

According to another aspect of the subject matter described herein, a non-transitory computer readable medium having stored thereon executable instructions that when executed by a processor of a computer control the computer to perform steps is provided. The steps include, at a first session border controller (SBC), establishing a first media session between a transferor and a transferee. The steps further include, at a second SBC, in response to a session initiation protocol (SIP) INVITE message initiated by the transferor and routed to the second SBC by a session router, establishing a second media session between the transferor and a transfer target. The steps further include receiving, at the first SBC, a SIP REFER message initiated by the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message including the dialog ID associated with the second media session. The steps further include, at the second SBC, receiving the SIP INVITE message, recognizing the SIP INVITE message as requesting an attended call transfer to the transfer target, and, in response, signaling with the transfer target and the first SBC to re-use the second media session to establish a media session between the transferee and the transfer target. The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for attended call transfer when multiple SBCs are involved and where the session with the transfer target is being re-used. For purposes of explaining the subject matter described herein, the original call is initiated by "A" towards "B", who in turn transfers the call to "C". In this case, "A" is the transferee, "B" is the transferor, and "C" is the transfer target. It is to be noted that the proposed solution would work the same way even if "A" initiates the transfer instead of "B", in which case the roles of "A" and "B" would be swapped. Also, the terms "call" and "session" are used interchangeably. In addition, the terms "transferor", "transferee", and "transfer target" are intended to refer to the landline or mobile telecommunications equipment used by the end users to establish the media sessions and effect the attended call transfer. In the examples described herein, attended call transfer is performed between user equipment (UEs). While the term UE is typically used to refer to a mobile device, the methods and systems described herein for inter-SBC attended call transfer with target session re-use are applicable when any one of the transferor, the transferee, and the transfer target are landline VoIP phones.

The SBC is the network element deployed in VoIP networks to monitor and control signaling and media streams in an Internet telephony call. Since all signaling passes through the SBC, it inherently supports the SIP call transfer procedure by transparently routing the call related signaling to/from the user agents. As will be described in detail below, existing SIP IP call transfer procedures involve a single SBC. However, when session routers are used to load balance sessions among SBCs, new sessions can land on different SBCs, and existing SIP call transfer procedures do not, without the modifications described herein, support attended call transfer with target session re-use.

Figure 1:
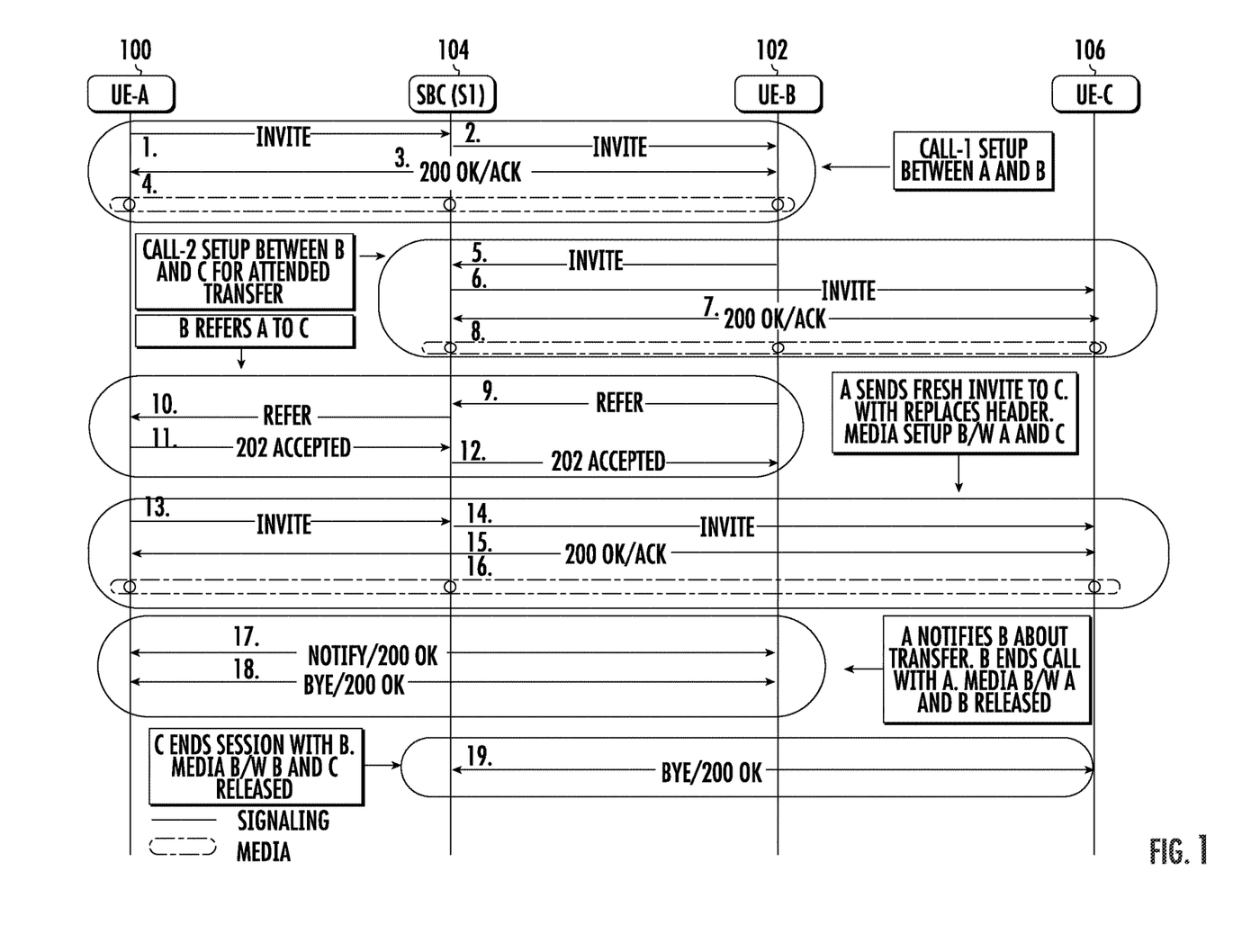
FIG. 1 is a message flow diagram illustrating exemplary messages exchanged for attended call transfer using a single SBC where the SBC relays a REFER message from the transferor to the transferee to refer the transferee to the transfer target.

FIG. 1 is a signaling message flow diagram illustrating exemplary SIP messages exchanged for attended call transfer involving a single SBC. Referring to FIG. 1, UE A 100 initiates a call with UE B 102 via SBC 104. The call setup process starts in line 1, where UE A 100 sends a SIP INVITE message to SBC 104. SBC 104 recognizes UE B 102 as the called party and in line 2 sends a SIP INVITE message to UE B 102. In line 3, UE B 102 sends a SIP 200 OK message to UE A 100 via SBC 104 and UE A 100 responds with an ACK message. After the exchange of the SIP 200 OK and ACK messages, a media session or call is set up between UE A 100 and UE B 102 via SBC 104, as evidenced by line 4.

In line 5, UE B 102 initiates the establishment of a call with the transfer target by sending a SIP INVITE message to SBC 104. SBC 104 recognizes UE C 106 as the called party and, in line 6, sends a SIP INVITE message to UE C 106. In line 7, UE C 106 sends a SIP 200 OK message to UE B 102 via SBC 104. After line 7, a second session or call is established between UE B 102 and UE C 106 via SBC 104, as evidenced by line 8.

In line 9 of the message flow diagram, UE B 102 initiates the referring of the call from UE A 100 to UE C 106 by sending a SIP REFER message to UE A 100 via SBC 104. In line 10, SBC 104 sends the SIP REFER message to UE A 100. In line 11, UE A 100 sends a SIP 202 message to UE B 102 via SBC 104. In line 12, SBC 104 sends the SIP 202 message to UE B 102.

In line 13 of the message flow diagram, UE A 100 initiates the process of establishing the media session with UE C 106 by sending a SIP INVITE message to UE C 106 via SBC 104. In line 14, SBC 104 sends the SIP INVITE message to UE C 106. The SIP INVITE message includes a Replaces header that indicates that the media session between UE B 102 and UE C 106 should be replaced with the newly established media session between UE A 100 and UE C 106.

In line 15, SIP 200 OK and ACK messages are exchanged, and, after line 15, a media session is established between UE A 100 and UE C 106 via SBC 104, as evidenced by line 16.

In lines 17 and 18, UE A 100 notifies UE B 102 about the transfer, and the resources associated with the media session between UE A and UE B are released. In line 19, SBC 104 and UE C 106 signal to release resources associated with the media session between UE B 102 and UE C 106.

Thus, in FIG. 1, an attended call transfer is performed using a single SBC and the SIP REFER method. In FIG. 1, after receiving the SIP REFER message in line 10, UE A 100 sends the INVITE message to initiate the process of connecting the media session with the transfer target. In some cases SBCs are sufficiently intelligent to participate in the call transfer to optimize the process by acting on behalf of one or more parties in the call transfer.

For example, the SBC can optionally generate an INVITE towards "C" on behalf of A when the SBC receives a REFER from B on the A-B session. This allows the call to be transferred without having to proxy the REFER back to A. Upon successfully establishing a SIP dialog with C, the SBC internally replaces B with C in the existing A-B session, thus connecting C to A without explicitly informing A about the call transfer. After the successful transfer, the SBC also optionally releases the dialog towards B on the A-B session. This applies to both blind and attended call transfers, and the associated signaling for the attended call transfer case is illustrated in FIG. 2.

Figure 2:
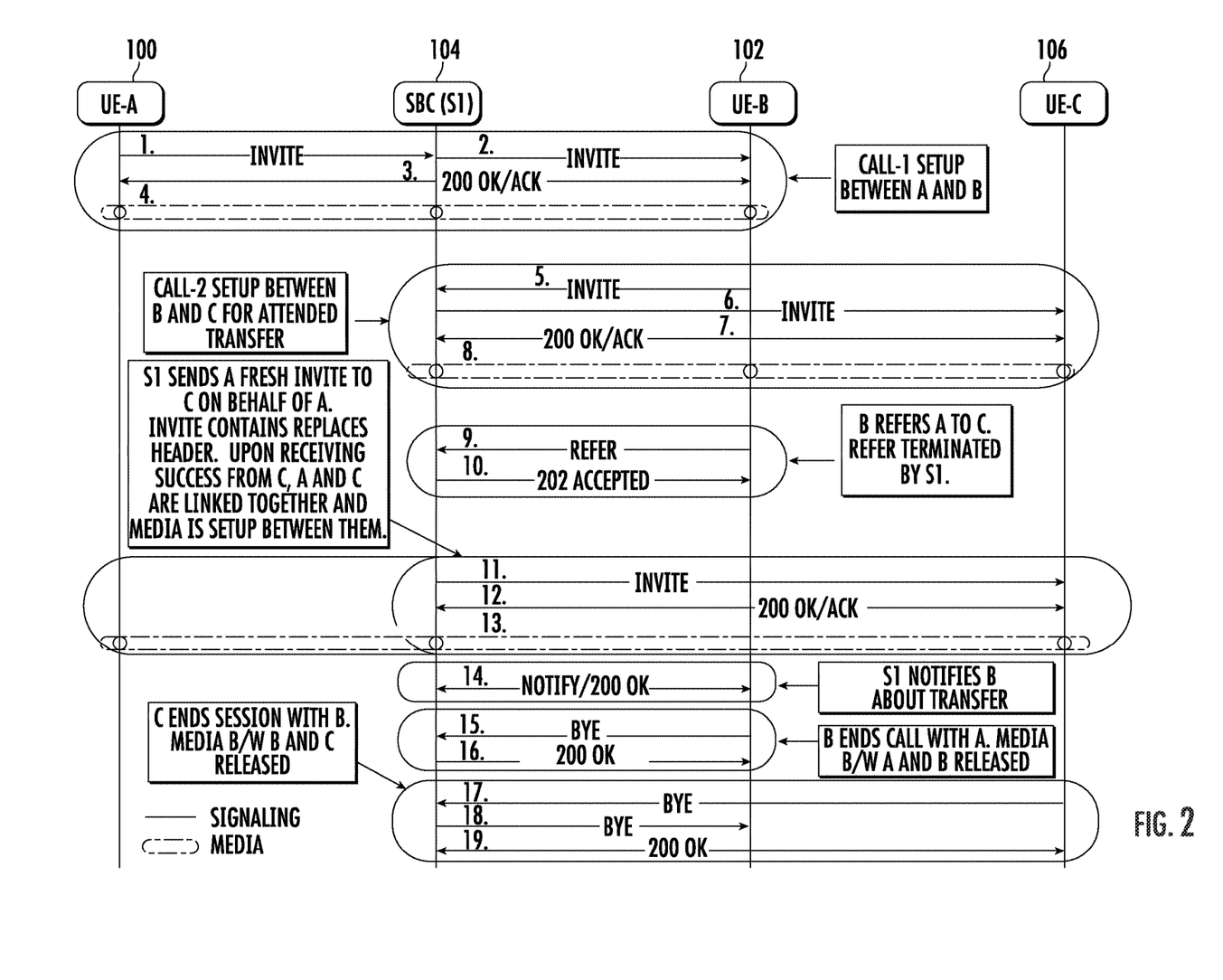
FIG. 2 is a message flow diagram illustrating exemplary messages exchanged for attended call transfer using a single SBC where the SBC initiates a session with the transfer target instead of relaying a REFER message to the transferee.

Referring to FIG. 2, in lines 1-3, UE A 100 and UE B 102 exchange signaling messages via SBC 104 to establish the media session between UE A 100 and UE B 102 through SBC 104. For example, in line 1, UE A 100 sends a SIP INVITE message to SBC 104. SBC 104 recognizes UE B 102 as the called party and in line 2 sends a SIP INVITE message to UE B 102. In line 3, UE B 102 sends a SIP 200 OK message to UE A 100 via SBC 104, and UE A 100 responds with an ACK message. After the exchange of the SIP 200 OK and ACK messages, a media session or call is set up between UE A 100 and UE B 102 via SBC 104, as evidenced by line 4.

In lines 5-7, UE B 102 signals with SBC 104 to establish the media session between UE B 102 and UE C 106 via SBC 104 for the attended call transfer. In line 5, UE B 102 sends a SIP INVITE message to SBC 104. SBC 104 recognizes UE C 106 as the called party and, in line 6, sends a SIP INVITE message to UE C 106. In line 7, UE C 106 sends a SIP 200 OK message to UE B 102 via SBC 104. After line 7, a second session or call is established between UE B 102 and UE C 106 via SBC 104, as evidenced by line 8.

In line 9 of the message flow diagram, UE B 102 sends a SIP REFER message to SBC 104, and in line 10, SBC 104 sends a SIP 202 accepted message to UE B 102. This is different from the call flow in FIG. 1 where the REFER message is forwarded to UE A 100. In line 11, SBC 104 sends an INVITE message to UE C 106 on behalf of UE A 100 to establish the media session between UE A 100 and UE C 106. In line 12, UE C 106 acknowledges the INVITE message by sending a SIP 200 OK message to SBC 104, which responds with an ACK message. After exchange of the 200 OK and ACK messages in line 12, a media session is established between UE A 100 and UE C 106 via SBC 104, as evidenced by line 13.

In line 14, SBC 104 signals with UE B 102 to notify UE B 102 of the transfer. In lines 15 and 16, UE B 102 ends the call with UE A 100, and the associated media resources are released. In lines 17-19, UE C 106 signals with SBC 104 to release the resources associated with the media session between UE B 102 and UE C 106. Thus, FIG. 2 illustrates the case where attended call transfer is performed using a single SBC, and the single SBC sends an INVITE message on behalf of the transferee.

In another example of attended call transfer, the two calls involved in the transfer (i.e., the A-B call and the B-C call) are established to the same SBC. The SBC can optionally send a Re-INVITE towards C on the already established B-C session to re-use the existing session instead of sending a fresh INVITE which in turn would create a new session. This is done to cater to some user agents that don't support the Replaces header in the INVITE message. After the call transfer, the SBC can also optionally release the call legs towards B on the A-B session as well as on the B-C session. This method is illustrated in FIG. 3 and is referred to as the Re-INVITE approach.

Figure 3:
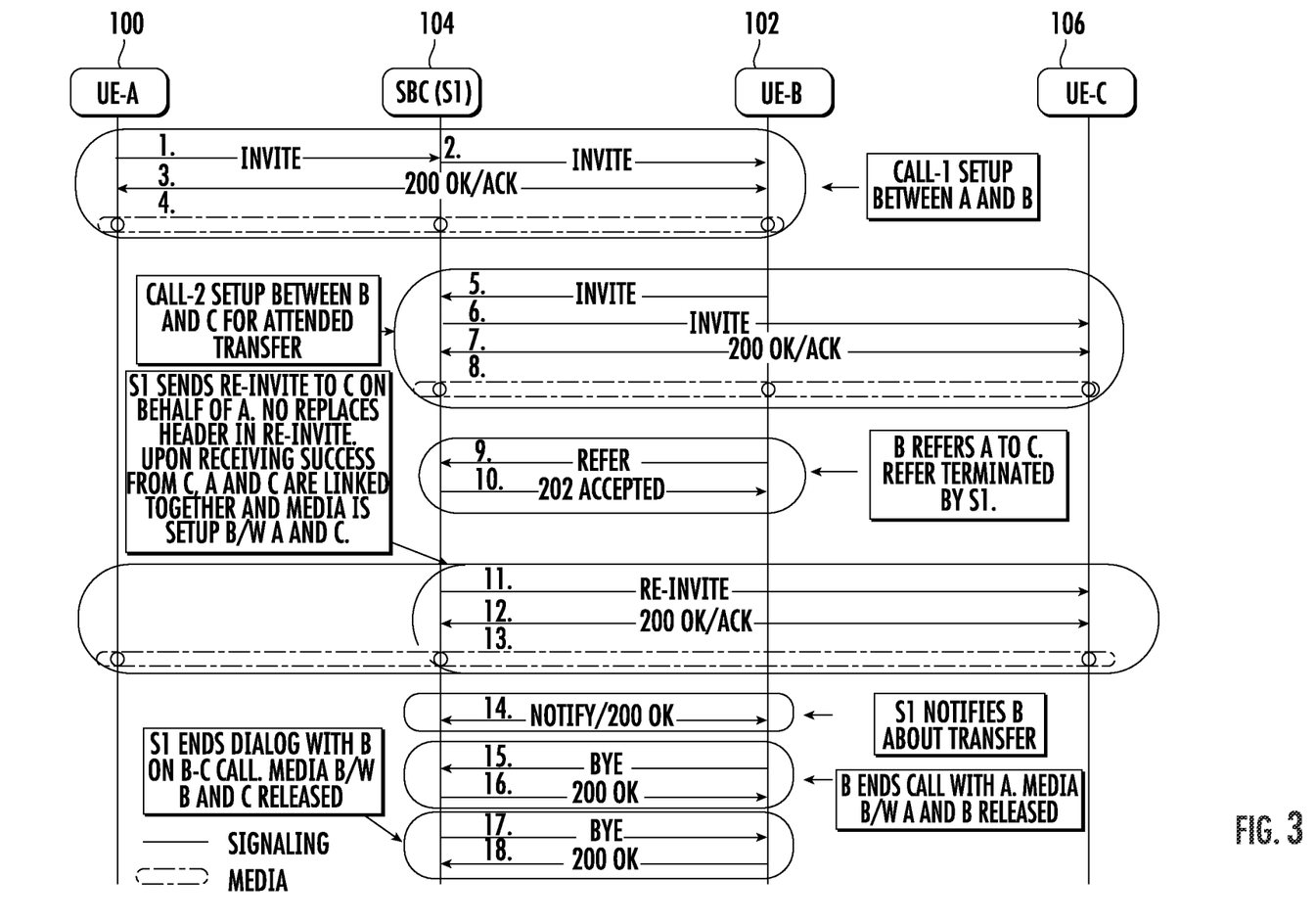
FIG. 3 is a message flow diagram illustrating exemplary messages exchanged for attended call transfer using a single SBC where the SBC uses the Re-INVITE procedure to re-use a previously established session between the transferor and the transfer target.

Referring to FIG. 3, the signaling in lines 1-4 is the same as in FIGS. 1 and 2 to establish the call between UE A 100 and UE B 102 via SBC 104. Similarly, the signaling and media in lines 5-8 establish the call between UE B 102 and UE C 106 via SBC 104.

Similar to FIG. 2, in lines 9-10, UE B 102 sends a REFER message to SBC 104 to refer UE A 100 to UE C 106. In line 11, the signaling in FIG. 3 differs from that in FIG. 2. In line 11 of FIG. 2, SBC 104 sends a fresh INVITE to UE C 106 on behalf of UE A 100 to initiate a new media session between UE A 100 and UE C 106. In line 11 of FIG. 3, SBC 104 sends a Re-INVITE to UE C 106 to re-use resources of SBC 104 associated with the existing media session between UE B 102 and UE C 106.

In line 12 of FIG. 3, UE C 106 accepts the Re-INVITE by sending a SIP 200 OK message to SBC 104, which responds with an ACK message. After line 12, a media session is set up between UE A 100 and UE C 106 via SBC 104. The media session between UE A 100 and UE C 106 re-uses resources of SBC 104 previously used for the media session between UE B 102 and UE C 106

Lines 14-16 are the same as the corresponding signaling in FIG. 2 where UE B 102 and SBC 104 signal to release the resources associated with the media session between UE A 100 and UE B 102. In line 17 and 18, SBC 104 signals with UE B 102 to release the resources associated with the media session between UE B 102 and UE C 106. Thus, FIG. 3 illustrates the case of attended call transfer using a single SBC where the SBC uses the Re-INVITE method.

Figure 4:
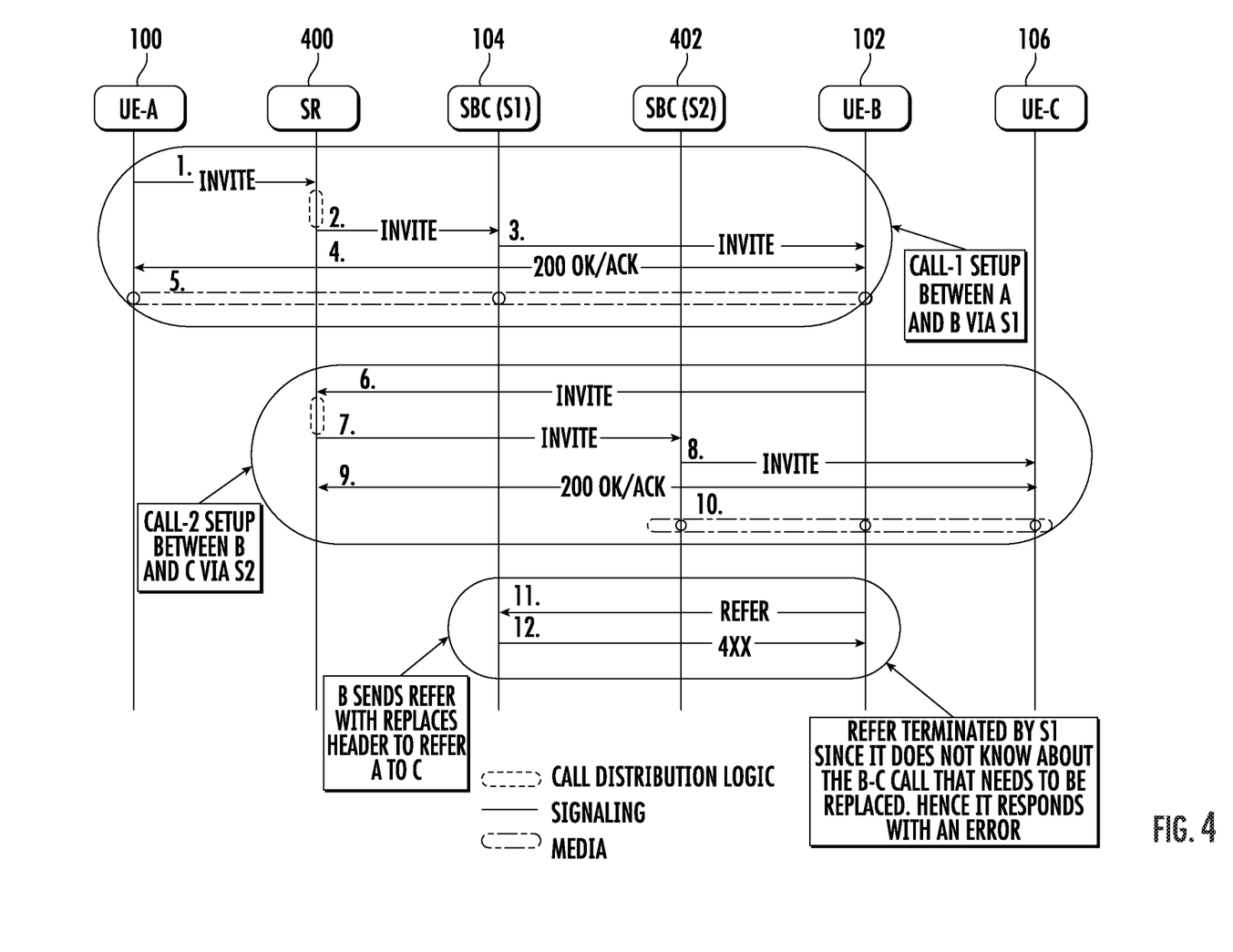
FIG. 4 is a message flow diagram illustrating exemplary messages exchanged for a failed attended call transfer when the initial session and the session with the transfer target reside on different SBCs.

The Re-INVITE approach illustrated in FIG. 3 works well as long as the two calls associated with the call transfer or established through the same SBC. However, in some cases, a set of SBCs are deployed behind a session load balancer/router or session router (SR) used to distribute new incoming calls among SBCs. This creates a problem for the above-mentioned scenario where the A-B call and the B-C call are established through different SBCs. In this case, if an SBC receives a REFER from B on the A-B session to transfer to C and the SBC does not host the B-C session, the SBC cannot proceed with the Re-INVITE approach. This is illustrated in FIG. 4. If this occurs, the SBCs would typically fall back to the standard behavior of sending an error response, transparently relaying the REFER to A, its intended recipient, or sending a fresh invite to C. In any of these cases, the media session between B and C cannot be re-used because the SBC that receives the REFER message has no knowledge of the media session being referred.

Referring to FIG. 4, in line 1, UE A 100 initiates a call with UE B 102 by sending an INVITE message to session router (SR) 400. Session router 400 performs its load balancing algorithm and determines that the call should be sent to SBC 104. Accordingly, in line 2, SR 400 sends the INVITE message to SR 104.

In line 3, SBC 104 sends the INVITE message to the called party, UE B 102. In line 4, UE B 102 sends a 200 OK message to UE A 100 via SBC 104 and UE A 100 responds with an ACK message. After line 4, a call or session is established between UE A 100 and UE B 102, as evidence by line 5.

In line 6, UE B 102 Initiates a call with UE C 106, the transfer target for purposes of call transfer. The process is initiated by sending an INVITE message to SR 400. SR 400 determines that the B-C call should land on SBC 402, accordingly in line 7, SR 400 sends the INVITE message to SBC 402 forwards the INVITE message in line 8 to UE C 106. In line 9, UE C 106 sends a 200 OK message to UE B 102 via SBC 402, and UE B 102 responds with an ACK message. After line 9, a media session is set up between UE B 102 and UE C 106 via SBC 402, as evidenced by line 10. However, it should be noted that SBC 104 has no knowledge of this media session.

In line 11, UE B 102 sends a REFER message to SBC 104 to refer the transferee to the transfer target (UE A 100 to UE C 106). The REFER message includes a Replaces header to refer A to C. Because SBC 104 does not know about the B-C call, in line 12, SBC 104 responds with an error message terminating the call transfer.

Users of SBCs such as network operators and enterprises, expect the re-INVITE approach to work even for the load balancing case, because SBCs and SRs are viewed as a single unit, especially when all of the equipment is provided by the same vendor. The subject matter described herein provides an optimized solution to facilitate the Re-INVITE approach for an attended call transfer when the two calls involved in the transfer are established through different SBCs that sit behind a session router that load balances sessions among the SBCs.

Figure 5:
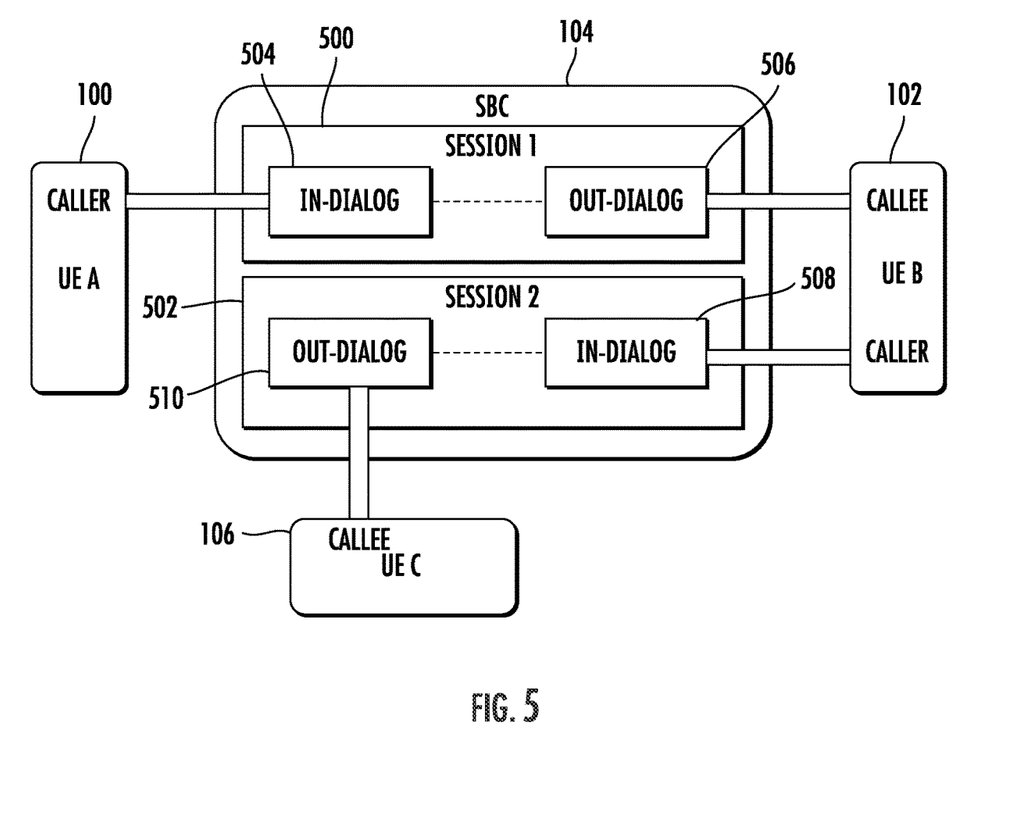
FIG. 5 is a block diagram illustrating an SBC and dialogs maintained by the SBC for performing an attended call transfer.

The subject matter described here in includes a method for establishing a new call between two SBCs anchoring the two calls involved in a call transfer, and the exchange of custom information between the SBCs to allow attended call transfer using the Re-INVITE approach. In order to perform the attended call transfer between SBCs using the Re-INVITE approach, the SBCs act as back to back user agents to manage a session between the UEs or user agents involved in the call. The SBC maintains two dialogs for each call or session, one with the calling party (in-dialog) the other with the called party (out-dialog). This is shown in FIG. 5. Referring to FIG. 5, SBC 104 maintains two sessions, session 1 500 between UE A 100 and UE B 102 and session 2 502 between UE B 102 and UE C 106. In session 1 500, SBC 104 maintains an in-dialog 504 with UE A 100 and an out-dialog 506 with UE B 102. Similarly, for session 2 502, SBC 104 maintains an in-dialog 508 with UE B 102 and an out-dialog 510 with UE C 106.

Figure 6:
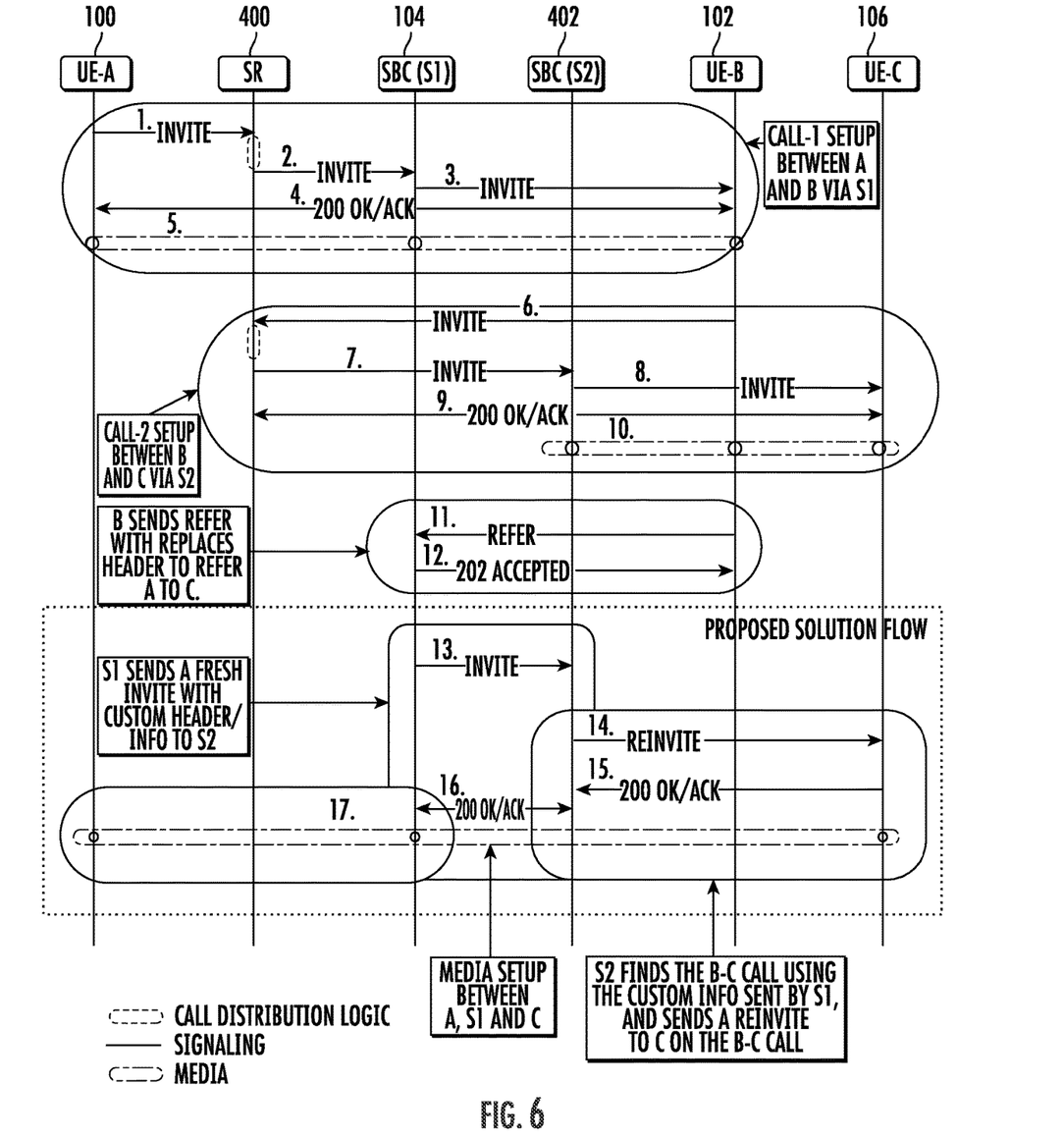
FIG. 6 is a message flow diagram illustrating exemplary messages exchanged for attended call transfer where the original session and the session with the transfer target reside on different SBCs with target session re-use.

FIG. 6 is the message flow diagram illustrating attended call transfer using multiple SBCs and the Re-INVITE method. Referring to FIG. 6, in lines 1-4, UE A 100 signals with UE B 102 to establish a call between UE A 100 and UE B 102 via SBC 104. After line 1, SR 400 selects SBC 104 for the first call. The corresponding call or media session is illustrated by line 5.

In lines 6-9, UE B 102 signals with UE C 106 to establish the media session or call between UE B 102 and UE C 106. In this example as with FIG. 4, SR 400 routes the second call to SBC 402. The second call or media session is illustrated by line 10.

In line 11 of the message flow diagram, UE B 102 sends a REFER message to SBC 104. The REFER message includes a Replaces header to refer A to C. When SBC 104 receives the REFER message from UE B 102 on the A-B session for an attended call transfer to C, SBC 104 first tries to find a matching in-dialog corresponding to the B-C session using the dialog identifier from the Replaces header in the REFER message. If SBC 104 does not find a matching dialog or session, SBC 104 will send a fresh INVITE message to all SBCs in the same load balancing or load sharing group as SBC 104. The INVITE message will carry a custom header indicating that this is a special call for triggering an attended call transfer towards the B-C session. The session description protocol (SDP) portion of the INVITE may be derived from the SDP portion of the INVITE message received by SBC 104 for the A-B session and may contain SBC 104 media information, such as IP address and port.

The presence of the custom header will serve as an indication to receiving SBCs to treat the INVITE message as a special INVITE and not route the call any further. If the SBC that receives the special INVITE message does not host a call that matches the dialog ID in the Replaces header, the SBC may send an error response message.

If the receiving SBC has a matching in-dialog to the dialog identifier in the Replaces header, then the SBC will Initiate the Re-INVITE process of referring A to C. The Re-INVITE will carry the same SDP information received from SBC 104.

Returning to the message flow in FIG. 6, in line 13, SBC 104 determines that it does not have a matching in-dialog to the dialog identified in the REFER message and sends an INVITE message to all SBCs in the load sharing group. SBC 402 is the only SBC that includes a matching in-dialog to the dialog in the Replaces header in the INVITE message. Accordingly, in line 14, SBC 402 sends a Re-INVITE message to UE C 106 to initiate the process of connecting the media session or the out-dialog for the media session in line 10 to the in-dialog of the media session with UE A in line 5. In line 15, UE C 106 responds with a 200 OK (success) response message.

Upon receiving the success response from UE C 106 in line 15 of the message flow diagram, SBC 402 replaces the in-dialog of the B-C session with the in-dialog of a new session being created between SBCs 402 and 104, which is hereinafter referred to as the S1-S2 session, and, in line 16, sends a success response to SBC 104 to complete the establishment of the S1-S2 session along with the session description carried in the SDP portion of the 200 OK received from UE C 106 in line 15. Transparently exchanging the session descriptions in the SDP portions of the 200 OK messages between SBC 104 and UE C 106 establishes a direct media path between SBC 104 and UE C 106, thus optimizing the media route. The establishment of the S1-S2 session completes the media session between UE A 100 and UE C 106 between or via SBCs 104 and 402, as illustrated by line 17.

Figure 7:
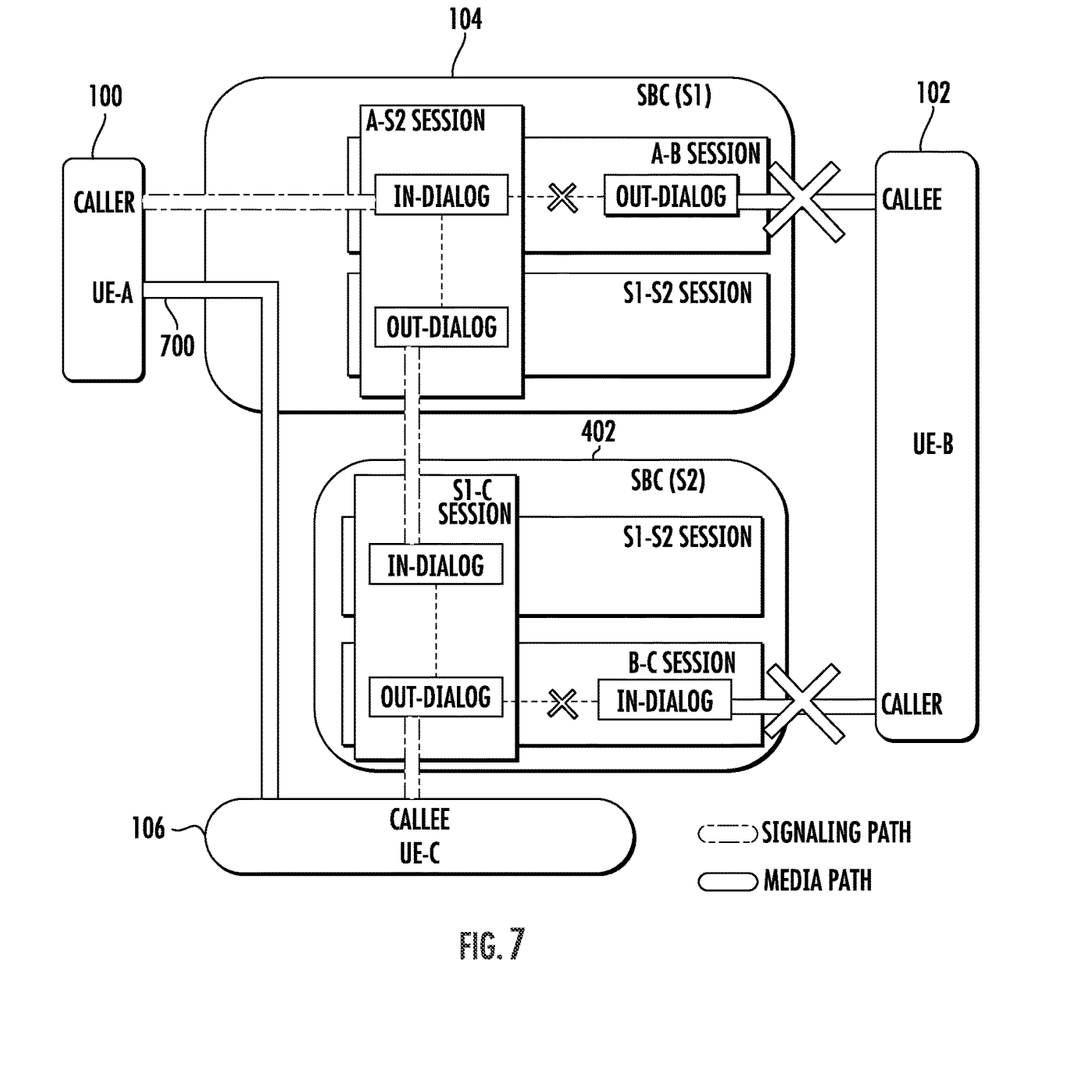
FIG. 7 is a block diagram illustrating two SBCs and dialogs associated with attended call transfer when media sessions associated with the attended call transfer reside on different SBCs.

FIG. 7 illustrates the state of the dialogs during and after the call transfer. As stated in the preceding paragraph, upon receiving the success response from UE C 106 in line 15 of the message flow diagram in FIG. 6, SBC 402 replaces the in-dialog of the B-C session with an in-dialog of the S1-S2 session. Similarly, upon receiving the success response from SBC 402 in line 16 of the message flow diagram, SBC 104 replaces the out-dialog in the A-B call with the out-dialog from the S1-S2 call. SBC 104 will then continue the signaling exchange (i.e., NOTIFY and BYE) with UE B 102 on the A-B call in the same manner as it would have if both calls were hosted on SBC 104. After creating media path 700 between UE A 100 and UE C 106, SBC 104 signals with UE B 102 to delete or free resources associated with the out-dialog for the A B session. Similarly, once the in-dialog on the B-C session is replaced with the in-dialog from the S1-S2 session, SBC 402 may free the resources associated with the in-dialog for the B-C session.

Figure 8:
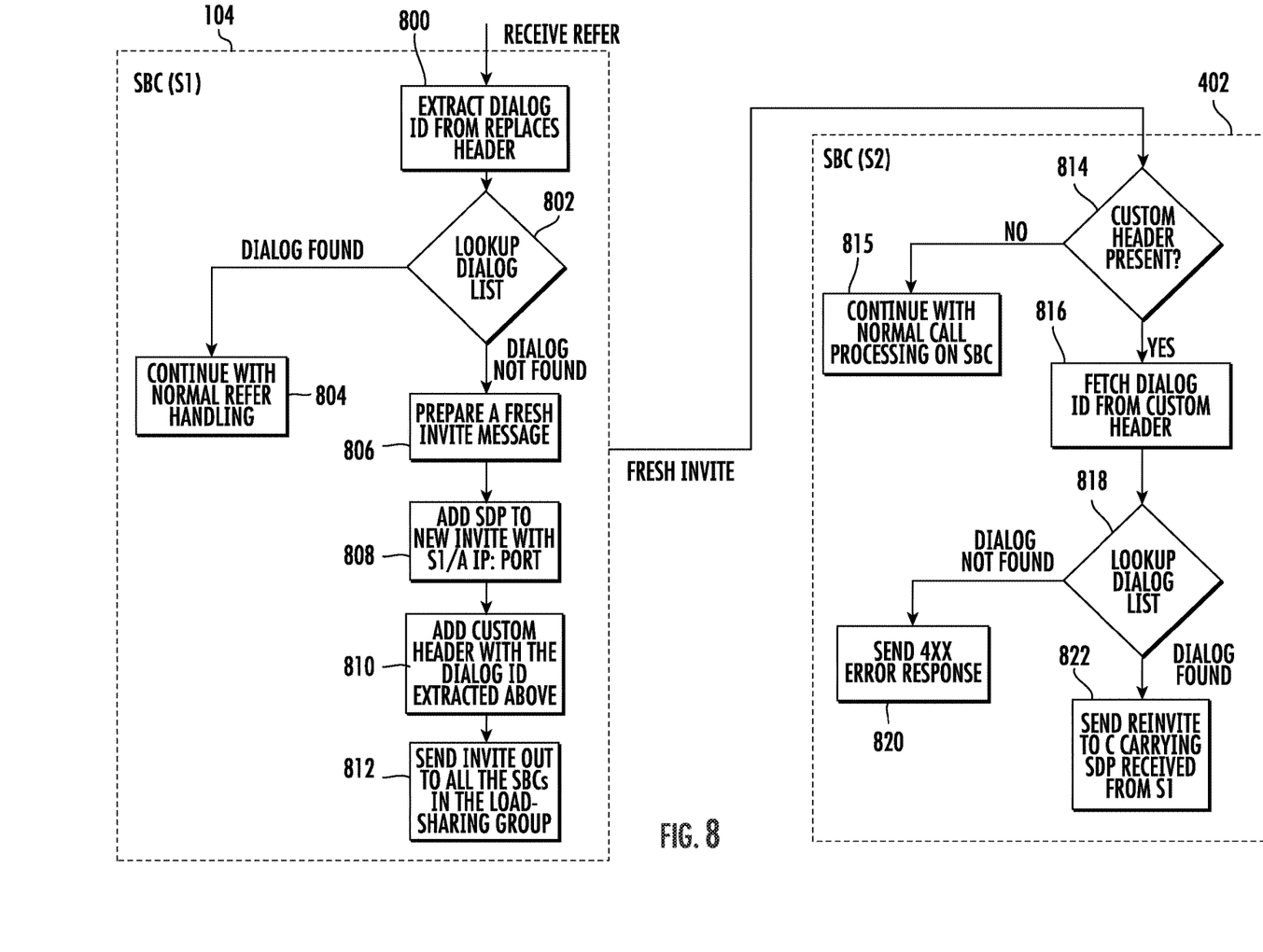
FIG. 8 is a flow chart illustrating an exemplary process for attended call transfer with target session re-use by two SBCs from the receipt of a REFER message up until the sending of a Re-INVITE message.
Figure 9:
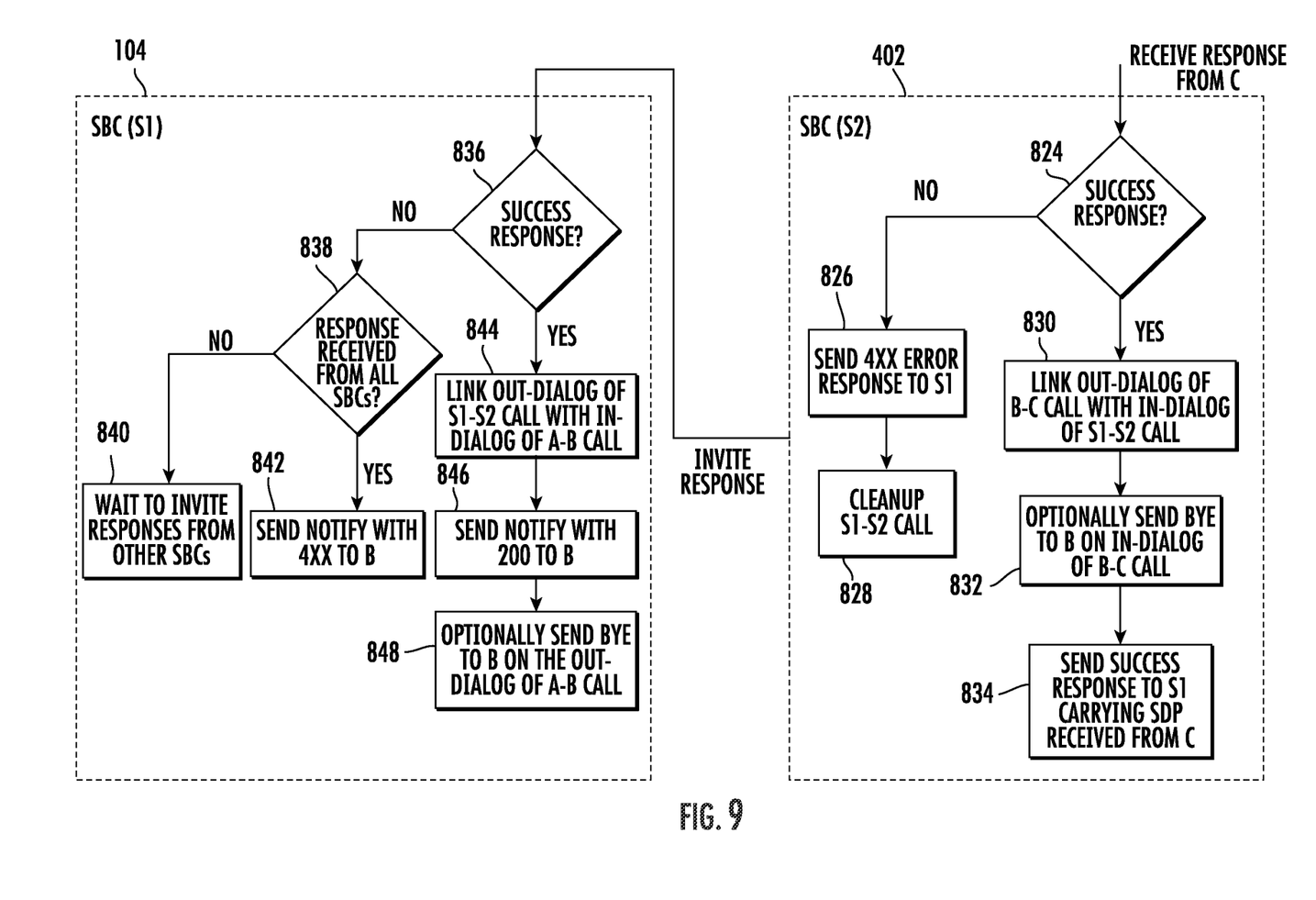
FIG. 9 is a flow chart illustrating an exemplary process for attended call transfer with target session re-use by two SBCs from the receipt of the response to an INVITE message until the call is transferred.

FIGS. 8 and 9 are flow charts illustrating exemplary processes performed by SBCs 104 and 402. In performing an attended call transfer when the original call and the call associated with the transfer target are established on separate SBCs. Referring to FIG. 8, the process begins when SBC 104 receives a REFER message from UE B. The REFER message may include the Replaces header, as described above with regard to line 11 in FIG. 6. SBC 104 extracts the dialog ID from the Replaces header. In step 802, SBC 104 determines whether the dialog ID extracted from the Replaces header is in a list of existing dialogs handled by SBC 104. If the dialog is found, this means that the call to which the calling party is being referred is being handled by SBC 104, and control proceeds to step 804 where REFER processing that does not involve an inter-SBC call is performed.

In step 802, if the dialog from the Replaces header is not found in the list of existing dialogs handled by SBC 104, control proceeds to step 806 where SBC 104 prepares a new INVITE message with the custom header information that identifies the INVITE message a request for an inter-SBC attended call transfer.

In step 808, SBC 104 adds the SDP portion including the IP address and port of SBC 104 or the A party (transferee in these examples) to the INVITE message. In step 810, SBC 104 adds the custom header with the dialog ID extracted from the REFER message to the INVITE message. In step 812, SBC 104 sends the INVITE message to all SBCs in the same load sharing group as SBC 104. SBCs that receive the special INVITE message will perform lookups in their respective lists of dialogs to determine whether they are handling the dialog present in the Replaces header of the INVITE message. If the dialog ID is not present in the list of dialog IDs being handled by the SBC, the SBCs will respond with a 4XX response. If the dialog ID from the Replaces header of the special INVITE message is found in the list of dialogs being handled by an SBC, the receiving SBC signals with the sending SBC to complete the call transfer.

SBC 402 receives the INVITE message and, in step 814, determines, whether the custom header is present. If the custom header is not present control proceeds to step 815 where normal call processing is performed on the SBC to establish a session indicated by the INVITE message. If the custom header is determined to be present in step 814, control proceeds to step 816 where SBC 402 extracts the dialog ID from the custom header.

In step 818, SBC 402 determines whether the dialog ID extracted from the Replaces header is present in a list of dialogs being handled by the SDP. If the dialog is not found, control proceeds to step 820, where SBC 402 sends a 4XX error response. If a dialog is found, control proceeds to step 822 where SBC 402 sends a Re-INVITE message to the transfer target carrying the SDP information received from SBC 104.

Referring to FIG. 9, the process begins when SBC 402 receives a response from UE C 106. In step 824, SBC 402 determines whether the response indicates a success in response to the Re-INVITE message. If the response does not indicate a success, control proceeds to step 826 where SBC 402 sends a 4XX error response to SBC 104. In step 828, SBC 402 cleans up the call between S1 and S2 by releasing resources.

In step 824, if SBC 402 determines that a success response is received from the transfer target, control proceeds to step 832 where SBC 402 links the out-dialog of the B C call with the in-dialog of the S1-S2 call. In step 824, SBC 402 optionally sends a BYE-message to UE B 102 on the in-dialog of the B C call to release resources. In step 834, SBC 402 sends a success response to SBC 104 carrying the SDP information received from UE C 106.

Upon receiving a response to the special INVITE message, SBC 104. In step 836, determines whether the response indicates a success. If the response does not indicate a success, control proceeds to step 838 where SBC 104 determines, whether responses have been received from all SBCs in the load-sharing group.

If responses have not been received for from all SBCs, control proceeds to step 840 where SBC 104 waits for INVITE responses from the other SBCs in the load sharing group. In step 838, if a response has been received from all SBCs and none of the responses indicates a success, control proceeds to step 842 where SBC 104 sends a NOTIFY message with a 4XX error code to UE B 102 indicating that the call transfer was not successful.

In step 836, if the response to the special INVITE message is a success, control proceeds to step 844 where SBC 104 links the out-dialog of the S1-S2 call with the in-dialog of the A-B call. Control then proceeds to step 846 where SBC 104 sends a NOTIFY message to UE B 102 indicating that the transfer was successful. In step 848, SBC 104 optionally sends a BYE message to UE B 102 on the out-dialog of the A-B call to release resources associated with that dialog.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for optimized attended inter-session border controller (SBC) call transfer with transfer target session re-use, the method comprising:

at a first SBC, establishing a first media session between a transferor and a transferee;

at a second SBC, in response to a session initiation protocol (SIP) INVITE message initiated by the transferor and routed to the second SBC by a session router, establishing a second media session between the transferor and a transfer target;

receiving, at the first SBC, a SIP REFER message initiated by the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message including the dialog ID associated with the second media session;

at the second SBC, receiving the SIP INVITE message sent by the first SBC, recognizing the SIP INVITE message sent by the first SBC as requesting an attended call transfer to the transfer target, and, in response, signaling with the transfer target and the first SBC to re-use the second media session to establish a media session between the transferee and the transfer target, wherein signaling with the first SBC and the transfer target to re-use the second media session to establish a media session between the transferee and the transfer target includes:

sending a SIP Re-INVITE message to the transfer target;

receiving a success response from the transfer target; and in response to receiving the success response from the transfer target, sending a success response to the first SBC;

establishing a media session between the first and second SBCs;

at the first SBC, replacing an out-dialog of the first media session with an out-dialog of the media session between the first and second SBCs; and at the second SBC, replacing an in-dialog of the second media session with an in-dialog of the media session between the first and second SBCs.

2. The method of claim 1 wherein establishing the first media session includes establishing the first media session in response to a SIP INVITE message originated by the transferee and forwarded to the first SBC by the session router, which selected the first SBC to handle the first media session using call distribution logic.

3. The method of claim 1 wherein the SIP INVITE message initiated by the transferor is sent to the second SBC based on call distribution logic of the session router.

4. The method of claim 1 wherein receiving the SIP REFER message includes receiving the SIP REFER message with a Replaces header that includes the dialog ID associated with the second media session.

5. The method of claim 1 wherein sending the SIP INVITE message including the dialog ID associated with the second media session includes adding a custom header to the SIP INVITE message indicating that the SIP INVITE message is to initiate an attended call transfer that re-uses second media session.

6. The method of claim 1 comprising, at the first SBC, sending a BYE message to the transferor and releasing resources associated with the out-dialog of the first media session.

7. The method of claim 1 comprising, at the second, SBC, sending a BYE message to the transferor and releasing resources associated with the in-dialog of the second media session.

8. A system for optimized attended inter-session border controller (SBC) call transfer with transfer target session re-use, the system comprising:

a first SBC for establishing a first media session between a transferor and a transferee; and a second SBC, for, in response to a session initiation protocol (SIP) INVITE message initiated by the transferor and routed to the second SBC by a session router, establishing a second media session between the transferor and a transfer target;

wherein the first SBC is configured for receiving a SIP REFER message from the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message including the dialog ID associated with the second media session;

wherein the second SBC is configured for receiving the SIP INVITE message sent by the first SBC, recognizing the SIP INVITE message sent by the first SBC as requesting an attended call transfer to the transfer target, and, in response, signaling with the transfer target and the first SBC to re-use the second media session to establish a media session between the transferee and the transfer target;

wherein, in signaling with the first SBC and the transfer target to re-use the second media session to establish a media session between the transferee and the transfer target, the second SBC is configured for:

sending a SIP Re-INVITE message to the transfer target;

receiving a success response from the transfer target; and in response to receiving the success response from the transfer target, sending a success response to the first SBC;

wherein the first and second SBCs are configured for establishing a media session between the first and second SBCs; and wherein the first SBC is configured for replacing an out-dialog of the first media session with an out-dialog of the media session between the first and second SBCs; and the second SBC is configured for replacing an in-dialog of the second media session with an in-dialog of the media session between the first and second SBCs.

9. The system of claim 8 wherein the first SBC is configured to establish the first media session in response to a SIP INVITE message originated by the transferee and forwarded to the first SBC by the session router, which selected the first SBC to handle the first media session using call distribution logic.

10. The system of claim 8 wherein the SIP INVITE message initiated by the transferor is sent to the second SBC based on call distribution logic of the session router.

11. The system of claim 8 wherein the SIP REFER message includes a Replaces header that includes the dialog ID associated with the second media session.

12. The system of claim 8 wherein the first SBC is configured to include the dialog ID associated with the second media session in a custom header of the SIP INVITE message, wherein the custom header indicates that the SIP INVITE message is to initiate an attended call transfer that re-uses second media session.

13. The system of claim 8 wherein the first SBC is configured for sending a SIP BYE message to the transferee and releasing resources associated with the out-dialog of the first media session and the second SBC is configured for sending a SIP BYE message to the transferor and releasing resources associated with the in-dialog of the second media session.

14. A non-transitory computer readable medium having stored thereon executable instructions that when executed by a processor of a computer control the computer to perform steps comprising:
- at a first session border controller (SBC), establishing a first media session between a transferor and a transferee;
- at a second SBC, in response to a SIP INVITE message initiated by the transferor and routed to the second SBC by a session router, establishing a second media session between the transferor and a transfer target;
- receiving, at the first SBC, a SIP REFER message initiated by the transferor and including a dialog ID associated with the second media session and, in response, determining that the dialog ID does not correspond to a media session currently being handled by the first SBC and sending a SIP INVITE message to a plurality of SBCs, including the second SBC, that are in a load sharing group with the first SBC, the SIP INVITE message sent by the first SBC including the dialog ID associated with the second media session;
- at the second SBC, receiving the SIP INVITE message sent by the first SBC, recognizing the SIP INVITE message sent by the first SBC as requesting an attended call transfer to the transfer target, and, in response, signaling with the transfer target and the first SBC to re-use the second media session to establish a media session between the transferee and the transfer target, wherein signaling with the first SBC and the transfer target to re-use the second media session to establish a media session between the transferee and the transfer target includes:
  - sending a SIP Re-INVITE message to the transfer target;
  - receiving a success response from the transfer target; and
  - in response to receiving the success response from the transfer target, sending a success response to the first SBC;
- establishing a media session between the first and second SBCs;
- at the first SBC, replacing an out-dialog of the first media session with an out-dialog of the media session between the first and second SBCs; and
- at the second SBC, replacing an in-dialog of the second media session with an in-dialog of the media session between the first and second SBCs.

* * * * *